United States Patent
Muramatsu et al.

(10) Patent No.: US 9,246,422 B2
(45) Date of Patent: Jan. 26, 2016

(54) MOTOR CONTROL DEVICE AND MOTOR CONTROL METHOD

(71) Applicant: SANYO DENKI CO., LTD., Tokyo (JP)

(72) Inventors: Yo Muramatsu, Tokyo (JP); Takahisa Toda, Tokyo (JP)

(73) Assignee: SANYO DENKI CO., LTD., Tokyo (JP)

( * ) Notice: Subject to any disclaimer, the term of this patent is extended or adjusted under 35 U.S.C. 154(b) by 207 days.

(21) Appl. No.: 14/012,574

(22) Filed: Aug. 28, 2013

(65) Prior Publication Data

US 2014/0062360 A1  Mar. 6, 2014

(30) Foreign Application Priority Data

Sep. 6, 2012 (JP) .................... 2012-196322

(51) Int. Cl.
*H02P 23/12* (2006.01)
*H02P 6/14* (2006.01)

(52) U.S. Cl.
CPC . *H02P 6/145* (2013.01); *H02P 6/14* (2013.01)

(58) Field of Classification Search
CPC ........... H02P 6/16; H02P 27/06; H02P 6/145; H02P 6/14; H02P 6/18; H02P 7/28
USPC ............... 318/400.14, 400.01, 400.1, 400.13, 318/400.26, 722, 254.1
See application file for complete search history.

(56) References Cited

U.S. PATENT DOCUMENTS

| | | | | |
|---|---|---|---|---|
| 4,988,939 A | * | 1/1991 | Reichard et al. | 318/800 |
| 5,206,567 A | * | 4/1993 | Sakurai et al. | 318/400.34 |
| 5,495,163 A | * | 2/1996 | Rozman | F02N 11/04 |
| | | | | 322/10 |
| 5,703,449 A | * | 12/1997 | Nagate | H02K 1/2746 |
| | | | | 318/400.01 |
| 5,767,643 A | * | 6/1998 | Pham | H02P 6/142 |
| | | | | 318/400.06 |
| 6,586,898 B2 | * | 7/2003 | King et al. | 318/400.34 |
| 7,053,573 B2 | * | 5/2006 | Okumura et al. | 318/400.03 |
| 8,159,164 B2 | * | 4/2012 | Horng et al. | 318/400.14 |

FOREIGN PATENT DOCUMENTS

| | | |
|---|---|---|
| JP | 2000-134978 A | 5/2000 |
| JP | 2001-145381 A | 5/2001 |
| JP | 2002191186 A | 7/2002 |
| JP | 2005-245076 A | 9/2005 |
| WO | WO-96/10863 A1 | 4/1996 |

OTHER PUBLICATIONS

Japanese Office Action mailed on Nov. 24, 2015 for the corresponding Japanese Patent Application No. 2012-196322.

* cited by examiner

*Primary Examiner* — Bentsu Ro
*Assistant Examiner* — Thai Dinh
(74) *Attorney, Agent, or Firm* — Novak Druce Connolly Bove + Quigg LLP

(57) ABSTRACT

A motor control device includes an energization pattern output portion and an inverter circuit. The energization pattern output portion cyclically outputs a plurality of energization patterns. The inverter circuit selectively connects respective coils provided in a motor to a rectifier circuit according to the output energization pattern. The energization pattern output portion delays the output timing of the energization pattern according to a rotation speed of the motor.

9 Claims, 7 Drawing Sheets

| Energization pattern / Sensor portion | 1 | 2 | 3 | 4 | 5 | 6 |
|---|---|---|---|---|---|---|
| H 1 | Lo | Hi | Hi | Hi | Lo | Lo |
| H 2 | Lo | Lo | Lo | Hi | Hi | Hi |
| H 3 | Hi | Hi | Lo | Lo | Lo | Hi |

| Energization pattern | 1 | 2 | 3 | 4 | 5 | 6 |
|---|---|---|---|---|---|---|
| Energization direction | U+ | U+ | V+ | V+ | W+ | W+ |
|  | V- | W- | W- | U- | U- | V- |

Duty characteristics (numerical value) data

Invention

| DUTY | Front stage | | Rear stage | | | Power reduction ratio |
|---|---|---|---|---|---|---|
| | Rotation speed | Current | Rotation speed | Current | Current(total) | |
| 100 | 12080 | 2.46 | 11340 | 2.32 | 5.01 | 0.0% |
| 90 | 11120 | 1.93 | 10520 | 1.96 | 3.89 | 4.9% |
| 80 | 9920 | 1.42 | 9460 | 1.44 | 2.88 | 8.0% |
| 70 | 8810 | 1.04 | 8350 | 1.02 | 2.06 | 13.8% |
| 60 | 7520 | 0.72 | 7150 | 0.70 | 1.35 | 22.0% |
| 50 | 6230 | 0.46 | 5940 | 0.45 | 0.91 | 26.0% |
| 40 | 5000 | 0.30 | 4800 | 0.28 | 0.58 | 26.6% |
| 30 | 3670 | 0.18 | 3560 | 0.17 | 0.35 | 36.4% |
| 20 | 2370 | 0.10 | 2370 | 0.10 | 0.20 | 37.5% |
| 10 | 0 | 0.03 | 0 | 0.03 | 0.06 | 0.0% |
| 0 | 0 | 0.03 | 0 | 0.03 | 0.06 | 0.0% |

Past device

| DUTY | Front stage | | Rear stage | | |
|---|---|---|---|---|---|
| | Rotation speed | Current | Rotation speed | Current | Current(total) |
| 100 | 11980 | 2.54 | 11300 | 2.50 | 5.01 |
| 90 | 11090 | 1.94 | 10430 | 1.94 | 4.09 |
| 80 | 9850 | 1.50 | 9310 | 1.49 | 3.13 |
| 70 | 8730 | 1.18 | 8300 | 1.21 | 2.39 |
| 60 | 7450 | 0.86 | 6990 | 0.84 | 1.73 |
| 50 | 6230 | 0.62 | 5950 | 0.61 | 1.23 |
| 40 | 4840 | 0.39 | 4780 | 0.38 | 0.79 |
| 30 | 3470 | 0.26 | 3390 | 0.26 | 0.55 |
| 20 | 2370 | 0.20 | 2250 | 0.19 | 0.32 |
| 10 | 0 | 0.03 | 0 | 0.03 | 0.06 |
| 0 | 0 | 0.03 | 0 | 0.03 | 0.06 |

FIG. 8

MOTOR CONTROL DEVICE AND MOTOR CONTROL METHOD

CROSS-REFERENCE TO RELATED APPLICATION

This application claims priority to Japanese Application No. 2012-196322, filed Sep. 6, 2012, the entirety of which is incorporated herein by reference.

BACKGROUND

1. Technical Field

The present invention relates to a motor control device and a motor control method which can optimize efficiency according to a rotation speed of an electric motor.

2. Description of Related Arts

In the past, a brushless motor that allows speed control in a wide range has been used as a fan motor. As described in JP 2002-191186 A described below, the brushless motor includes a plurality of Hall elements, and detects a rotation position of a rotor, using a signal output from the Hall elements.

The energization pattern of the stator coils in the brushless motor is determined according to a rotation position of the rotor. The energization pattern is a pattern indicating the stator coil connected to the power supply according to the rotation position of the rotor as well as a direction of the current that flows through the stator coil connected to the power supply. The stator coils are energized according to a predetermined energization pattern depending on the rotation position of the rotor.

However, the energization pattern of the stator coils changes simultaneously with the change of a signal output from one of the plurality of Hall elements. Usually, timing of change of the signals output from the Hall elements becomes quick as the rotation speed of the rotor decreases.

In the past brushless motor, therefore, as the rotation speed decreases, the timing of the position detection of the rotor by the Hall elements becomes quicker, and the energization pattern switches more rapidly as compared with the optimum timing. Ina low rotation speed range, therefore, it becomes difficult for the rotor to use effectively a magnetic force generated by the stator coils so that efficiency lowers, and power consumption with respect to the output increases.

For compensating for deviation of detection timing of the rotor position that occurs in a low rotation speed range, it is envisaged to shift the arrangement of the Hall elements in the rotation direction of the rotor by an amount corresponding to the timing deviation. In this manner, however, the efficiency of the fan motor operating at a variable speed cannot be always optimized according to the rotation speed.

SUMMARY

The invention has been made for overcoming the above disadvantages of the past, and a purpose of the invention is to provide a motor control device and a motor control method that can optimize efficiency according to a rotation speed of the motor.

For achieving the above purpose, the motor control device according to the invention includes an energization pattern output portion and an inverter circuit.

The energization pattern output portion cyclically outputs a plurality of energization patterns. The inverter circuit selectively connects respective coils provided in the motor to a power supply according to the output energization pattern.

The energization pattern output portion delays the output timing of the energization pattern according to a rotation speed of the motor.

The motor control device according to the invention delays switching of a present energization pattern to a next energization pattern as the rotation speed of the motor decreases, and thereby rotates the motor with optimum efficiency according to the rotation speed.

For achieving the above purpose, a motor control method according to the invention includes a first stage that selects an energization pattern according to a rotation position of a rotor of a motor, a second stage that calculates a rotation speed of the rotor, a third stage that calculates a delay time from the rotation speed of the rotor and a fourth stage that outputs the selected energization pattern with a delay of the calculated delay time, and continuously rotates the motor while repeating the first to fourth stages.

Similarly to the motor control device described above, the motor control method according to the invention delays switching from a present energization pattern to a next energization pattern as a rotation speed of a motor decreases, and rotates the motor with optimum efficiency according to the rotation speed.

The invention configured as described above delays the output timing of the energization pattern according to the rotation speed of the motor, and therefore can optimize the efficiency according to the rotation speed.

BRIEF DESCRIPTION OF THE DRAWINGS

FIG. 8 illustrates characteristics of a past motor control device and a measurement result of characteristics of the motor control device according to the embodiment;

DETAILED DESCRIPTION

Embodiments of a motor control device and a motor control method according to the invention will be described below.

[Structure of Motor Control Device]

Figure 1:
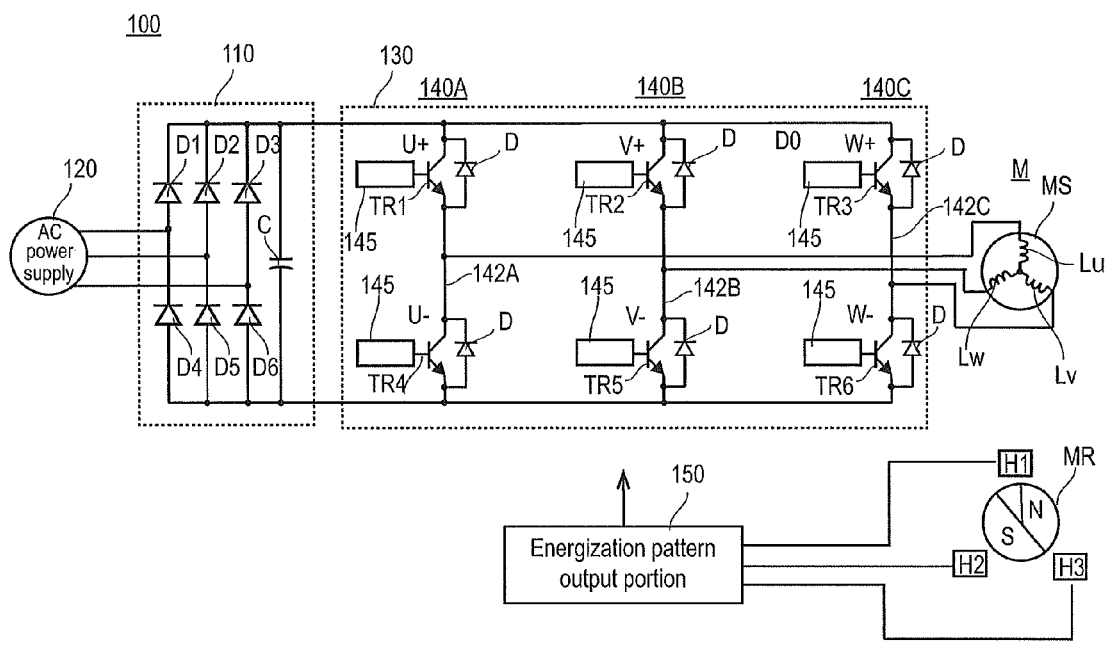
FIG. 1 illustrates a structure of a motor control device according to an embodiment.

FIG. 1 illustrates a structure of a motor control device according to an embodiment.

A motor control device 100 includes a rectifier circuit 110 provided with a smoothing capacitor C and an inverter circuit 130 connected to a motor M.

The rectifier circuit 110 includes six bridge-connected diodes D1-D6 as illustrated in the figure, and the six diodes D1-D6 perform full-wave rectification on a current flowing from an AC (3-phase) power supply 120. The smoothing capacitor C smoothes the current subjected to the full-wave rectification by the six diodes D1-D6 so that the ripple in the DC current subjected to the full-wave rectification decreases. The rectifier circuit 110 is a power supply of the motor M.

The inverter circuit 130 is connected in parallel to the rectifier circuit 110. The inverter circuit 130 includes three arm circuits 140A, 140B and 140C switching the DC current rectified by the rectifier circuit 110.

The arm circuit 140A connects a pair of transistors TR1 and TR4 in series, and connects a stator coil Lu of the motor M to a connection line 142A between the paired transistors TR1 and TR4. The arm circuit 140B connects a pair of transistors TR2 and TR5 in series, and connects a stator coil Lw of the motor M to a connection line 142B between the paired transistors TR2 and TR5. The arm circuit 140C connects a pair of transistors TR3 and TR6 in series, and connects a stator coil Lv of the motor M to a connection line 142C between the paired transistors TR3 and TR6.

The three arm circuits 140A, 140B and 140C are connected in parallel to the smoothing capacitor C of the rectifier circuit 110. A diode D is reversely connected between a collector and an emitter of each of six transistors TR1, TR4, TR2, TR5, TR3 and TR6. Drive circuits 145 are individually connected to the gates of these six transistors TR1, TR4, TR2, TR5, TR3 and TR6 for switching these transistors, respectively.

The motor M employed, by way of example, in this embodiment is a brushless motor. A stator MS of the motor M includes three star-connected stator coils Lu, Lv and Lw. A rotor MR of the motor M includes a cylindrical magnet divided into two and magnetized to include N- and S-poles, and rotates using a magnetic field formed by the stator coils Lu, Lv and Lw.

Figure 3:
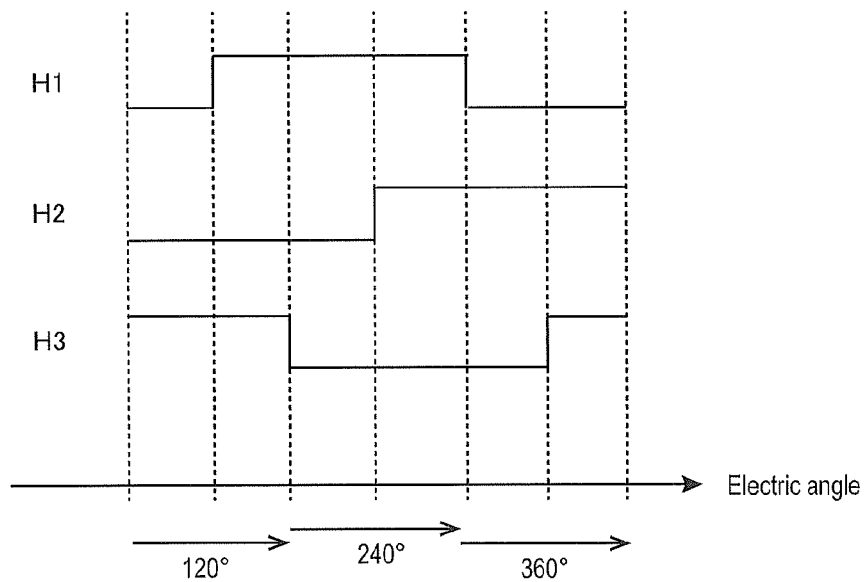
FIG. 3 illustrates signals output from sensor portions illustrated in FIG. 1.

Three sensor portions H1, H2 and H3 are arranged at the circumference of the rotor MR in the rotation direction of the rotor MR. The three sensor portions H1, H2 and H3 are arranged to have a phase difference of 120° therebetween. For example, as illustrated in FIG. 3, each of the sensor portions H1, H2 and H3 outputs a signal of Hi when it is opposed to the N-pole of the rotor MR, and outputs a signal of Lo when it is opposed to the S-pole thereof. Switching between the Hi signal and the Lo signal occurs at a boundary between the N- and S-poles. The sensor portions H1, H2 and H3 function as the rotation position detection sensor that detects the rotation position of the rotor MR. In the embodiment, it is assumed that the sensor portions H1, H2 and H3 are formed of Hall elements. However, sensors other than the Hall elements may be employed provided that they can detect the rotation position of the rotor MR. The stator coils Lu, Lv and Lw may be used in place of the sensor portions to provide the rotation position detection sensor.

The sensor portions H1, H2 and H3 can also detect a rotation speed of the rotor MR. The sensor portions H1, H2 and H3 output a pulse signal of a pulse width corresponding to the rotation speed of the rotor MR. The sensor portions H1, H2 and H3 also function as a rotation speed detection sensor that detects a rotation speed of the rotor MR.

The motor control device 100 includes an energization pattern output portion 150 connected to the sensor portions H1, H2 and H3. The energization pattern output portion 150 cyclically outputs a plurality of energization patterns to each drive circuit 145. The energization pattern output portion 150 delays the output timing of the energization pattern according to the rotation speed of the motor M. More specifically, the energization pattern output portion 150 delays the output timing of the energization pattern by a longer time as the rotation speed of the motor M decreases. The inverter circuit 130 selectively connects the stator coils Lu, Lv and Lw provided in the motor M to the rectifier circuit 110 according to the energization pattern.

The energization pattern is a pattern representing the stator coils Lu, Lv and Lw that are connected to the rectifier circuit 110 according to the rotation position of the rotor MR as well as the directions of the currents flowing through the stator coils Lu, Lv and Lw connected to the rectifier circuit 110, respectively. A specific example of the energization pattern will be described later in detail.

Figure 2:
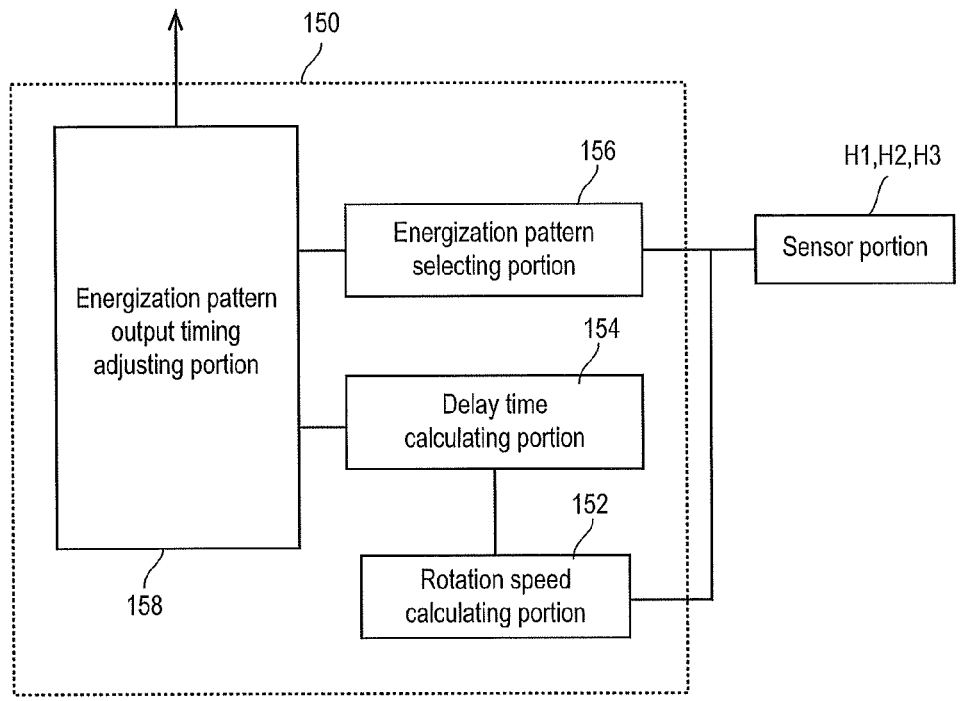
FIG. 2 is a block diagram illustrating a structure of an energization pattern output portion illustrated in FIG. 1.

FIG. 2 is block diagram illustrating a structure of the energization pattern output portion 150 illustrated in FIG. 1. The energization pattern output portion 150 includes a rotation speed calculating portion 152, a delay time calculating portion 154, an energization pattern selecting portion 156 and an energization pattern output timing adjusting portion 158.

The rotation speed calculating portion 152 calculates the rotation speed of the rotor MR based on the pulse signal output from the sensor portions H1, H2 and H3.

The delay time calculating portion 154 calculates the delay time for delaying the output timing of the energization pattern according to the rotation speed of the calculated rotation speed of the rotor MR. The delay time calculating portion 154 includes a table describing the rotation speed of the rotor MR and the delay time corresponding to the rotation speed. The delay time is 0 when the rotor MR rotates at a rated rotation speed, and increases by t msec every time it decreases from the rated rotation speed by a predetermined rate. Therefore, the delay time calculating portion 154 increases stepwise the delay time as the rotation speed of the rotor MR decreases from the rated rotation speed.

The delay time calculating portion 154 may not include the above table, and may be configured to calculate the delay time corresponding to the rotation speed of the rotor MR. In this case, the delay time calculating portion 154 continuously increases the delay time as the rotation speed of the rotor MR decreases from the rated rotation speed.

The energization pattern selecting portion 156 selects the energization pattern according to the rotation position of the rotor MR detected by the three sensor portions H1, H2 and H3

Each of the three sensor portions H1, H2 and H3, outputs, as illustrated in FIG. 3, the Hi or Lo signal depending on the rotation position of the rotor MR, respectively. The energization pattern selecting portion 156 receives the Hi and Lo signals output from each of the three sensor portions H1, H2 and H3, and recognizes the rotation position's of the rotor MR. Since each of the three sensor portions H1, H2 and H3 outputs the Hi and Lo signals phase shifted by 120° in electrical angle from each other, the energization pattern selecting portion 156 can recognize the rotation position of the rotor MR at every 60°.

The energization pattern selecting portion 156 selects, for example, the energization pattern 1 when the sensor portions H1, H2 and H3 output the Lo, Lo and Hi signals, respectively. Also, the energization pattern selecting portion 156 selects the energization pattern 4 when the sensor portions H1, H2 and H3 output the Hi, Hi and Lo signals, respectively.

Figures 4, 5:
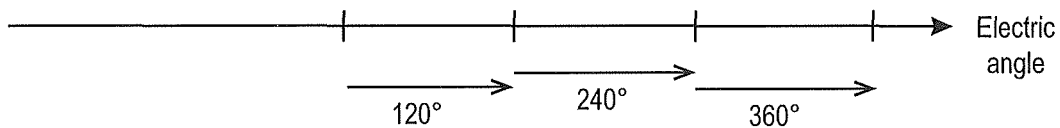
FIG. 4 illustrates a relationship between energization patterns and the signals output from the sensor portions.
FIG. 5 illustrates a relationship between the energization patterns and energization directions of the stator coils.

The combinations of the Hi and Lo signals output from the three sensor portions H1, H2 and H3 can exhibit six patterns as illustrated in FIG. 4. The energization patterns 1-6 are set corresponding to these six patterns, respectively. Therefore, the energization pattern selecting portion 156 can select the energization pattern corresponding to the rotation position of the rotor MR by recognizing the rotation position of the rotor MR detected by the three sensor portions H1, H2 and H3. The energization pattern transits in the order of 1, 2, 3, 4, 5, 6, 1, 2 . . . . When the energization pattern proceeds from 1-6, the rotor MR makes one rotation. Consequently, the energization pattern selecting portion 156 circularly selects the energization patterns 1-6 every time the rotor MR makes one rotation.

FIG. 5 illustrates a relationship between the energization pattern and the energization direction of the stator coil. As illustrated in the figure, when the energization pattern 1 is output from the energization pattern output timing adjusting portion 158, it exhibits the energization directions of U+ and V−. Therefore, the drive circuit 145 performs the switching of the transistors TR1 and TR5 illustrated in FIG. 1 to flow the current through a closed circuit extending from the rectifier circuit 110 through the transistor TR1, the stator coil Lu, the stator coil Lw and the transistor TR5 to the rectifier circuit 110. When the energization pattern 2 is output from the energization pattern output timing adjusting portion 158, it exhibits the energization directions of U+ and W−. Therefore, the drive circuit 145 performs the switching of the transistors TR1 and TR6 to flow the current through a closed circuit extending from the rectifier circuit 110 through the transistor TR1, the stator coil Lu, the stator coil Lv and the transistor TR6 to the rectifier circuit 110. Further, when the energization pattern 3 is output from the energization pattern output timing adjusting portion 158, it exhibits the energization directions of V+ and W−. Therefore, the drive circuit 145 performs the switching of the transistors TR2 and TR6 to flow the current through a closed circuit extending from the rectifier circuit 110 through the transistor TR2, the stator coil Lw, the stator coil Lv and the transistor TR6 to the rectifier circuit 110. In connection with the energization patterns 4-6, the current flows through a closed circuit formed in the substantially same manner as the energization patterns 1-3. The drive circuit 145 performs the PWM control on the transistors forming the closed circuit.

Figure 7:
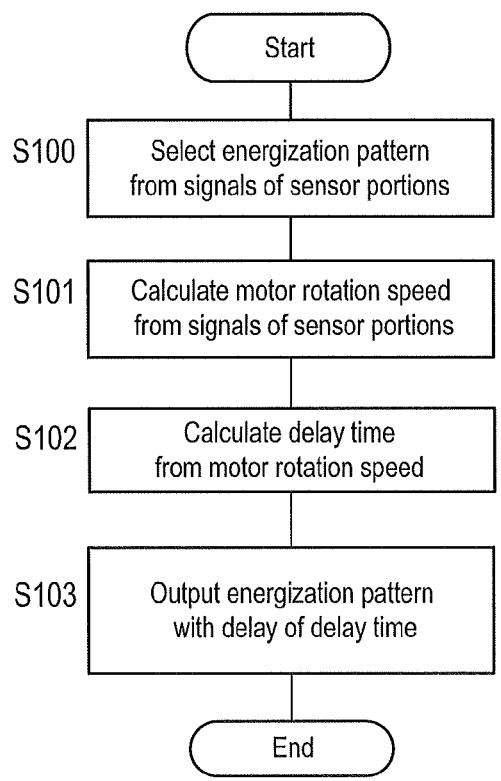
FIG. 7 is an operation flowchart of a motor control device according to the embodiment.

The energization pattern output timing adjusting portion 158 delays the energization pattern selected by the energization pattern selecting portion 156 by a delay time calculated by the delay time calculating portion 154, and then outputs it to the inverter circuit 130. For example, as illustrated in FIG. 7, when the energization pattern is switched from 1-2 and the rotation speed of the rotor MR is high, the instruction for the energization pattern 2 is output to the drive circuit 145 without a delay. When the rotation speed of the rotor MR is medium, the instruction for the energization pattern 2 is output to the drive circuit 145 with a delay of t1 msec. When the rotation speed of the rotor MR is low, the instruction for the energization pattern 2 is output to the drive circuit 145 with a delay by t2 msec. Similar manners are employed when switching the energization pattern from 2-3 and the like.

[Operation of Motor Control Device]

An operation of the motor control device 100 illustrated in FIG. 1 will be described below. FIG. 7 is an operation flowchart of the motor control device 100. The processing procedure in this operation flowchart represents a procedure of the motor control method.

First, the energization pattern selecting portion 156 selects the energization pattern from the signals provided of the three sensor portions H1, H2 and H3. The combination of the signals of the three sensor portions H1, H2 and H3 represents the rotation position of the rotor MR, and consequently the energization pattern selecting portion 156 selects the energization pattern according to the rotation position of the rotor MR (step S100).

Then, the rotation speed calculating portion 152 calculates the rotation speed of the rotor MR (motor M) based on the pulse signals output from the three sensor portions H1, H2 and H3 (step S101).

The delay time calculating portion 154 calculates a delay time for adjusting the timing of outputting the energization pattern based on the rotation speed of the rotor MR (motor M) calculated by the rotation speed calculating portion 152 (step S102).

Figure 6:
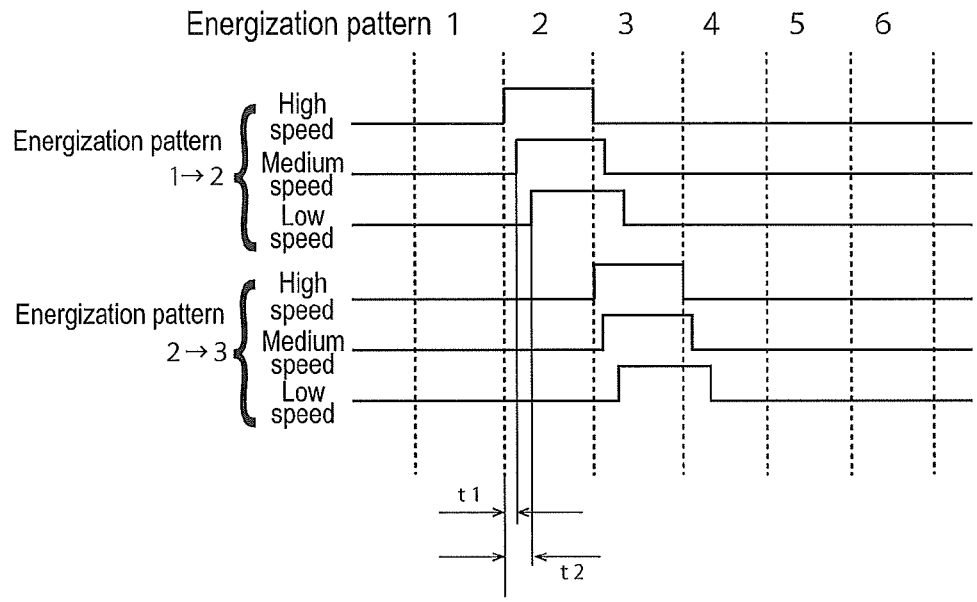
FIG. 6 illustrates output timing of the energization patterns.

The energization pattern output timing adjusting portion 158 outputs the energization pattern selected by the energization pattern selecting portion 156 by a delay time calculated by the delay time calculating portion 154. For example, as illustrated in FIG. 6, when the rotor MR rotates at a medium speed, it outputs the energization pattern with a delay of t1 msec as compared with the case of the high speed. When the rotor MR rotates at a low speed, it outputs the energization pattern with a delay of t2 msec as compared with the case of the high speed. When the output of the energization pattern delays, the switching of the energization pattern by the inverter circuit 130 delays so that it is possible to eliminate the errors in detection timing of the sensor portions H1, H2 and H3 (step S103).

The motor control device 100 rotates the motor M by repeating the processing from the above step S100 to the step S103.

[Effect by the Motor Control Device]

As described above, even in the case where the conditions that require the switching of the energization pattern in the past are satisfied, the motor control device 100 according to the embodiment intentionally delays the timing of switching the energization pattern when the rotation speed of the motor is low. Therefore, it is possible to overcome easily such a disadvantage that the energization pattern is switched early when the motor rotation speed is low, as compared with the case of the high rotation speed.

Figure 9:
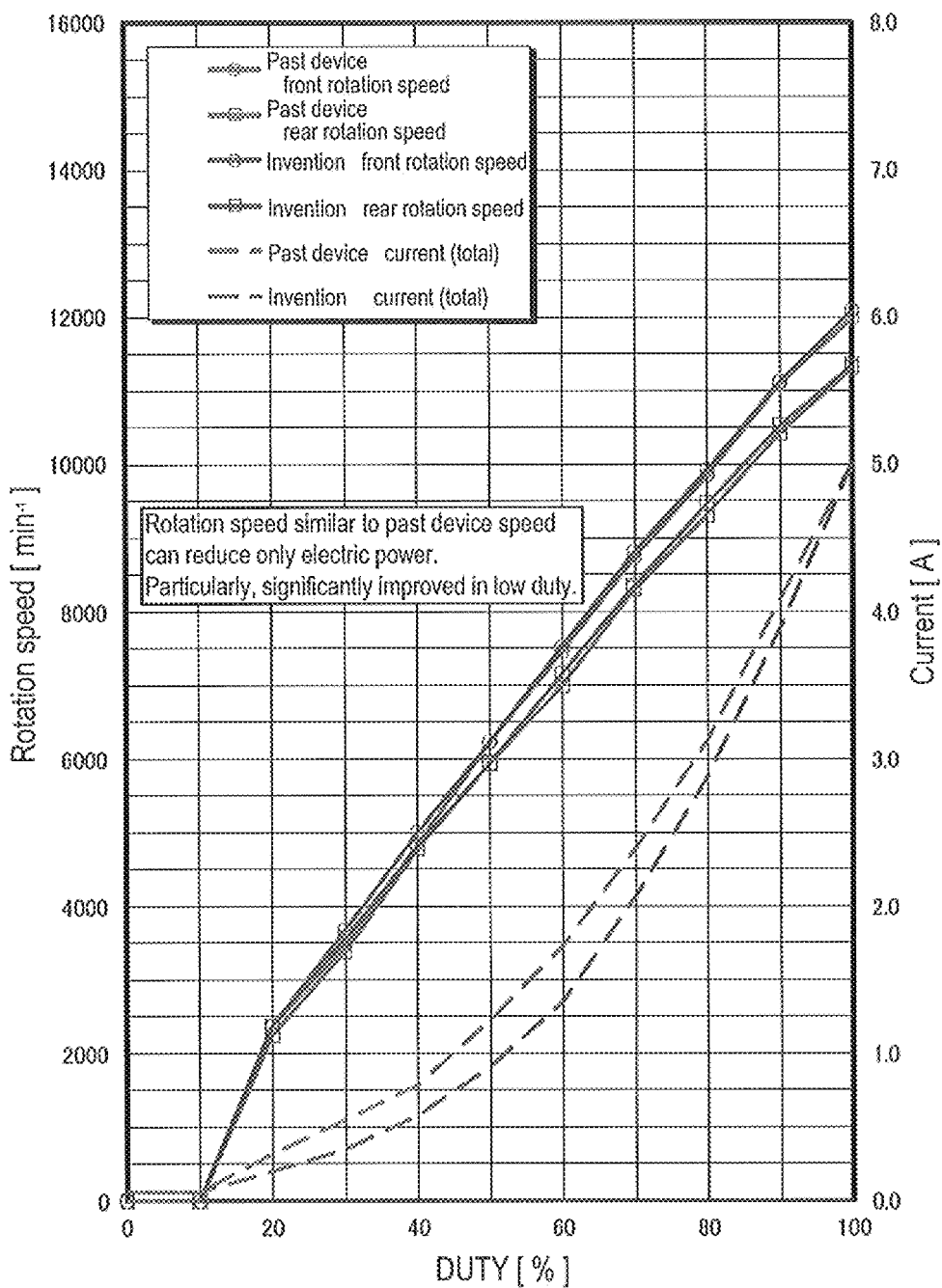
FIG. 9 is a graph visualizing the measurement result of FIG. 8.

FIG. 8 illustrates measurement results of the characteristics of the past motor control device and those of the motor control device according to the embodiment. FIG. 9 is a graph visualizing the measurement results in FIG. 8.

The measurements of the characteristics of the motor control device are performed on fan motors of a type in which the two fan motors are connected in series and are operated at different rotation speeds for blowing, respectively. In these figures containing expressions "Front Stage" and "Rear Stage", the fan motor on the front stage is positioned on an upstream side in the blowing direction of the fan motor, and the fan motor on the rear stage is positioned on a downstream side in the blowing direction.

As can be seen from these figures, the electric power reduction ratios of the motors on the front and rear stages increase in accordance with the change from the state in which a duty ratio is large and thus the motor rotates at high speed to the state in which the duty ratio is small and thus the motor rotates at low speed. Therefore, when the rotation speed is uniform, the motor control device according to the embodiment can reduce the current flowing through the stator coils as compared with the past motor control device. Accordingly, the power consumption with respect to the output of the motor can be small. Particularly, as illustrated in FIG. 9, it can be understood that the shifting of the output timing of the energization pattern significantly raises the efficiency in the middle-speed range.

Figure 10:
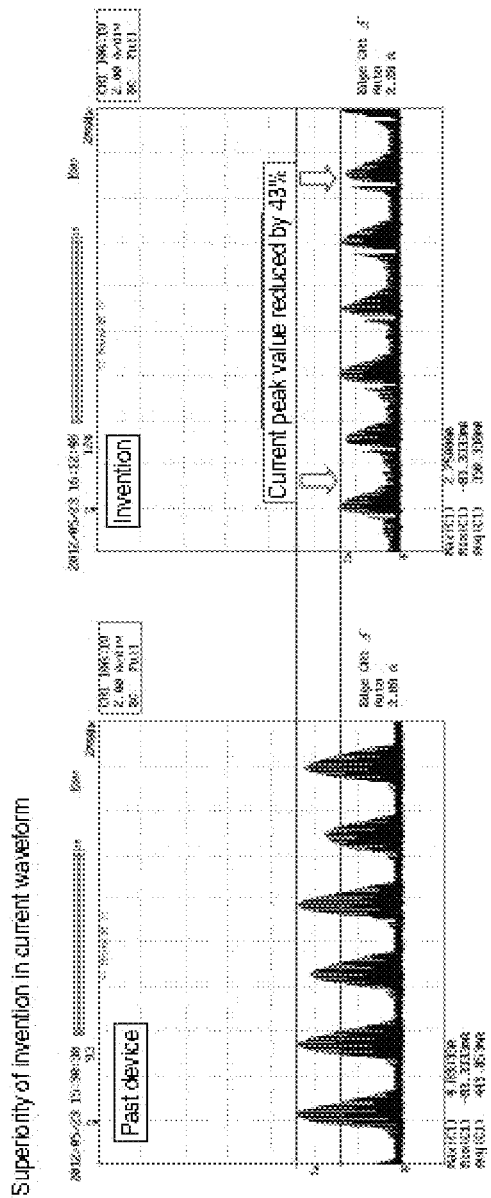
FIG. 10 is a current waveform diagram obtained when the past motor control device and the motor control device according to the embodiment drive the same motor under the same conditions.

FIG. 10 is a current waveform diagram illustrating the cases where the past motor control device and the motor control device according to the embodiment drive the same motor, respectively.

From comparison in this current waveform diagram, it can be seen that, in spite of the fact that the same load is driven at the same speed, the peak of the current lowers by 43% (from 233 mA of the past device to 152 mA of the invention), and it can be understood that the efficiency of the motor of the invention is significantly improved as compared with that of the past motor.

According to the motor control device and the motor control method of the invention, as described above, since the output timing of the energization pattern is electrically delayed according to the rotation speed of the motor, the efficiency can be optimized according to the rotation speed of the motor.

Although the embodiment including the three-phase motor is described by way of example, the concept of the invention can be applied to various kinds of motors of different phases such as single-phase, 2-phase and 5-phase motors. Although the embodiment is described in connection with an example of the rotor having two poles, the concept of the invention can likewise be applied to motors having three or more poles. Further, it can be applied to motors of various numbers of slots.

FIG. 1
Ac power supply
Energization pattern output portion
FIG. 2
152: Rotation speed calculating portion
154: Delay time calculating portion
156: Energization pattern selecting portion
158: Energization pattern output timing adjusting portion
H1, H2, H3: Sensor portion
FIG. 3
Electric angle
FIG. 4
Energization pattern
Sensor portion
FIG. 5
Energization pattern
Energization direction
Electric angle
FIG. 6
Energization pattern
High speed
Medium speed
Low speed
FIG. 7
Start
S100: Select energization pattern from signals of sensor portions
S101: Calculate motor rotation speed from signals of sensor portions
S102: Calculate delay time from motor rotation speed
S103: Output energization pattern with delay of delay time
End
FIG. 8
Duty characteristics (numerical value) data
Invention
Front stage
Rear stage
Power reduction ratio
Past device
Rotation speed
Current
Current (total)
FIG. 9
Example of duty characteristics
Past device front rotation speed
Past device rear rotation speed
Invention front rotation speed
Invention rear rotation speed
Past device current (total)
Invention current (total)
Rotation speed
Current
Rotation speed similar to past device speed can reduce only electric power.
Particularly, significantly improved in low duty.
FIG. 10
Superiority of invention in current waveform
Past device
Invention
Current peak value reduced by 43%

What is claimed is:

1. A motor control device comprising:
an energization pattern output portion that cyclically outputs a plurality of energization patterns; and
an inverter circuit that selectively connects respective coils provided in a motor to a power supply according to the output energization pattern, wherein
the energization pattern output portion, in response to a decrease in rotation speed of the motor during output of a particular energization pattern, delays for a delay period an output timing of a next energization pattern that follows the particular energization pattern, and continues to output the particular energization pattern during the delay period.

2. The motor control device according to claim 1,
wherein the energization pattern output portion includes:
an energization pattern selecting portion that selects the energization pattern according to a rotation position of a rotor of the motor detected by a rotation position detecting sensor;
a delay time calculating portion that calculates a delay time for delaying the output timing of the energization pattern according to the rotation speed of the rotor detected by the rotation speed detecting sensor; and
an energization pattern output timing adjusting portion that outputs the selected energization pattern with a delay of the calculated delay time.

3. The motor control device according to claim 2,
wherein the delay time calculating portion increases stepwise the delay time as the rotation speed of the rotor decreases.

4. The motor control device according to claim 2,
wherein the delay time calculating portion continuously increases the delay time as the rotation speed of the rotor decreases.

5. The motor control device according to claim 1,
wherein the energization pattern is a pattern indicating the coil connected to the power supply and a direction of a current flowing through the coil connected to the power supply according to the rotation position of the rotor and
the energization pattern output portion circulates and outputs the plurality of energization patterns every time the rotor makes one rotation.

6. A motor control method comprising:
a first stage that selects an energization pattern according to a rotation position of a rotor of a motor;
a second stage that calculates a rotation speed of the rotor;
a third stage that calculates a delay time from the rotation speed of the rotor; and
a fourth stage that outputs the selected energization pattern with a delay of the calculated delay time, wherein
when the energization pattern selected during the first stage is switched to the energization pattern selected during the fourth stage, an output timing of the energization pattern selected during the fourth stage is delayed by a delay period as the rotation speed of the rotor decreases, during the delay period, the energization pattern selected during the first stage is continuously being outputted, and the motor is continuously rotated while repeating the first to fourth stages.

7. The motor control method according to claim 6, wherein the delay time increases stepwise as the rotation speed of the rotor decreases.

8. The motor control method according to claim 6, wherein the delay time continuously increases as the rotation speed of the rotor decreases.

9. The motor control method according to claim 6, wherein the energization pattern is a pattern indicating a coil of the motor connected to a power supply and a direction of a current flowing through the coil connected to the power supply according to a position of the rotor and the plurality of energization patterns circulate every time the rotor makes one rotation.

\* \* \* \* \*